July 29, 1930.  C. L. WAGNER  1,771,829
APPARATUS FOR THE RECOVERY OF CHEMICALS AND HEAT FROM WASTE LIQUORS
Filed Jan. 24, 1925
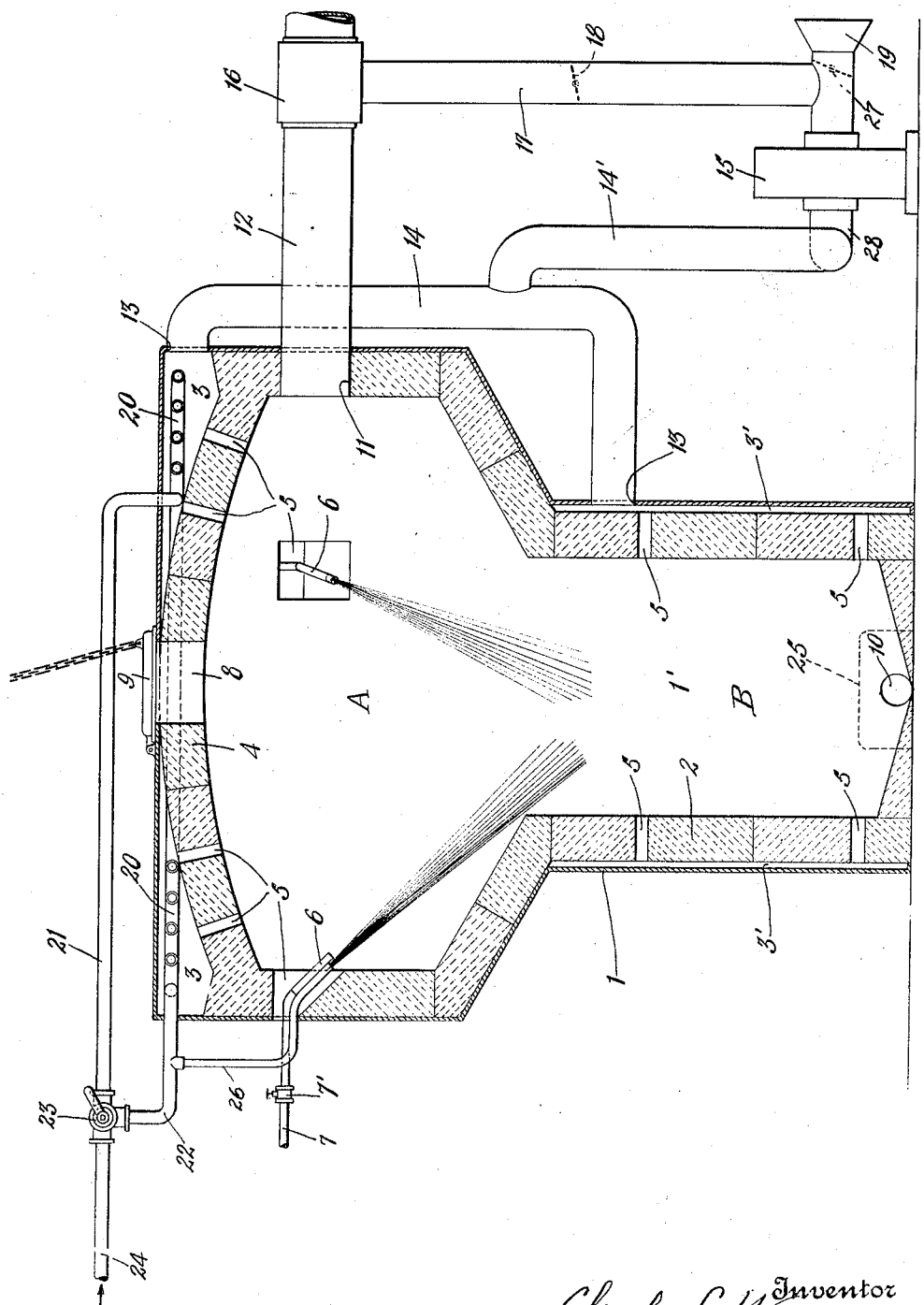
Inventor
Charles L. Wagner
By his Attorney Patented July 29, 1930

1,771,829

UNITED STATES PATENT OFFICE

CHARLES L. WAGNER, OF BOONTON, NEW JERSEY, ASSIGNOR TO C. L. W. PATENTS CORPORATION, A CORPORATION OF NEW JERSEY

APPARATUS FOR THE RECOVERY OF CHEMICALS AND HEAT FROM WASTE LIQUORS

Application filed January 24, 1925. Serial No. 4,359.

This invention relates to an improvement in method and apparatus for the recovery of heat and chemicals from waste liquors from certain processes used in industry.

One of the processes in which this invention finds ready adaptation is in the paper pulp industry.

The chemical paper pulp processes using soda and sulphur either singly or in various combinations commercially known as "soda," "sulphate" or "monosulphite" processes, entail a considerable loss of soda or sulphur in the waste liquors and in their recovery. Attempts have been made to utilize waste liquors or powders by the "black ash" process in which organic waste liquor is substituted for carbon and the commercial incineration of waste liquors or powders having a heat value or fusible chemicals. This has not been practicable owing to the moisture content and dust losses.

The rotary process to utilize the waste liquors employs rotaries and requires leaching of products recovered and employs the injection of the waste liquors under pressure or gravity and with or without preheating. The volatile combustibles are usually driven off without the necessary oxygen mixture and temperature necessary for combustion, giving "dirty" gases, which condense and deposit tar products on surfaces, and there is very little heat recovery in the boilers.

Among the objects of my invention is to provide a self-sustaining process and apparatus for recovering chemical waste liquors; to provide a unitary structure capable of recovering the active re-agents from different process waste liquors in a continuous operation; to eliminate the use of an additional continuously operable heating medium for carrying out the combustion of the waste liquor; to collaterally produce heat from the volatile constituents of the waste liquors, which heat finds ready adaptation in outside heating units, such as steam boilers, and to provide an apparatus and method that can be operated by labor easily available.

Other objects will appear more fully hereinafter.

Referring to the drawings:

Figure 1 is a longitudinal cross sectional view of a furnace embodying the principles of my invention.

In carrying out my invention, I propose to atomize the waste liquors in air preheated to cause destructive distillation of the organic material in a combustion zone and to burn the gases given off, the solid particles dropping to a second combustion zone in a fluffy incandescent mass when the destructive distillation and combustion is completed.

The organic matter, carbon and chemicals being burned through agency of air or through reduction of sulphates and sulphites which give up their oxygen to the carbon to form CO and this burns with air to $CO_2$ giving sufficient heat to fuse salts, if fusible, supply heat for maintaining combustion and reduction temperature to walls and entering air and evaporate the moisture in entering material, making a continuous process and with a residuum of heat for use elsewhere. By this process, no fuel is used after the preheating of the furnace, the air is governed to maintain a reducing atmosphere to prevent oxidation of chemicals to undesirable compounds, dust losses are entirely eliminated, in distinction from the rotary process, which requires fuel, labor, dust chambers and necessitates leaching of the resulting carbon waste to recover the chemicals while in this process the material is secured pure and may be dropped into water in molten state securing immediate solution in concentrated form if desired. This invention can be used in connection with the Le Blanc soda process and in such case the mixture of nitre or salt cake, lime as carbonate or hydrate and powdered carbon or coal can be blown through a nozzle with same results, no loss of chemicals resulting and no extra fuel is used as in rotary process.

I provide a furnace chamber of metal 1 or other heat resisting material, substantially air tight, with a refractory lining wall 2, so placed as to have air spaces 3, 3', which serve as a preheating process for air entering under pressure. Within space 3, I provide a coil 20 through which the air to nozzles 6 may be passed through conduit 21 when additional preheating of the entering air to the nozzles is desired. I provide a three way valve 23, connected to main air feed conduit 24, to by-pass the air direct to nozzles 6 through conduit 26 when such preheating is not desired. Nozzles 6 are shown as fixed and inclined downwardly though it is contemplated within the scope of my invention to vary the angular displacement thereof or to make them rotatable.

Chamber 1' and air spaces 3, 3', are divided or arranged for proportioning air to enter at certain zones or combustion areas through pipes 14, 14', from turbine fan 15. Fan 15 draws air either direct from the atmosphere when damper 18 is closed and damper 24 is open or through preheater 16 in the flue or boiler stack 12 when damper 18 is open and damper 24 is closed. Chamber 1' is preferably surmounted by a dome roof 4, likewise insulated, with an opening 8 for entrance and exit of gases while preheating. Openings 5 serve for the accommodation of the waste liquor spray nozzles 6, or as passageways through which air being discharged from the preheated areas may be distributed into the upper furnace chamber zone "A", or the lower chamber zone "B" respectively. Though not shown in the drawings, preheating area 3 may be used for preheating of waste liquor using air under pressure to atomize the preheated waste liquor entering in the nozzles or both the air and waste liquor may be preheated in the preheating area 3.

Although air has been indicated as the atomizing means either preheated or not, steam or any other gas or vapor may be readily adaptable for this purpose. The air feed systems in the preheating areas 3 and 13 consists of a turbine fan 15, drawing air either from the atmosphere through conduit 19, when the damper 27 in said conduit 19 is open and when damper 18 in the connecting conduit 17 is closed, or, through conduit 17 from a preheater 16 in the conduit 12 when the damper 18 is open and the damper 19 is closed. The air passing through the turbine fan 15 is discharged into main conduit 28, from which two mains 14 and 14' protrude into openings 13 of the preheating areas 3 and 3' respectively.

The waste hot gases produced in the furnace chamber are discharged through conduit 12 leading to any other heat consuming apparatus or to the boiler and stack (not shown). The gases in passing out of said conduit 12 enter into contact with preheater 16 as above stated, and raise the temperature of the air to be subsequently distributed into the chambers 3 and 3' by the turbine fan 15.

Though the air distribution and heating system is herein indicated as a forced feed system, it is well within the contemplation of my invention to substitute suction or other air feed means for that method.

The fluid feed for distributing both the fuel oil, which is adapted for preheating the furnace chamber "A", and the waste liquor which is to be distributed, is carried on through conduit 7, the respective passage of oil or waste liquor being controlled by a three-way valve 7' maintained in the fluid feed line.

The fuel or waste liquor is passed from feed line 7 into nozzles 6, which are positioned in the openings, or tuyeres 5, in metallic casing 1 and refractory 2.

To prevent any explosion when excess of gases is developing within the furnace during the preheating of the interior thereof, by the fuel oil burning, an opening 8 provided with a drop lid 9 is positioned near the arch 4 of the refractory lining 2. This lid 9 is maintained in the open position only when the preheating of the chamber is being carried on with oil, so as to prevent any explosions, but as soon as the preheating of the chamber is completed and the waste liquor is being fed through the nozzles 6, after the fuel oil supply has been shut off, the lid 9 is closed and the volatilization begins. The gases developed in the chamber by the combustion of the volatile constituents of the waste liquor, is drawn through opening 11 in the chamber from whence it passes to the boiler stack conduit 12.

At the base of the furnace I provide tap hole 10.

The operation is as follows:

Oil is atomized through nozzles 6 into chamber 1, lid 9 being lifted, where it is burnt until the temperature is between 1200° F. and 2500° F. when the oil supply is turned off and the waste liquor is atomized and ignited within chamber 1. The nozzles 6 direct the atomized liquid downwardly adjacent the side walls and towards the common center in the first zone of combustion. When utilizing the waste liquors of the pulp process, commonly known as the "soda" process, the resulting waste liquor from the soda is recovered as carbonate and contains all of the organic intercellular matter of the raw material called generally "lignin" or "lignones", cellulose, sugars, salts, etc., solution with certain methyl derivatives partly formed and distilled off during the digestion and following concentration of liquors in the pulp industry.

When this liquor is atomized in the preheated air it is carbonized or destructively distilled in zone A. The gases given off are those given off in the dry distillation of wood-methyl alcohol, pyroligneous acid derivatives (gaseous), light oils of terpene series, tars, permanent gases of methane, ethane, hydrogen and carbon monoxide. The required zone, I have found to be between 9 and 15 feet in height. The residue which drops into zone B is carbon and non-volatile salts. On further incineration with air preferably preheated admitted through opening 13' the carbon burns off to CO and $CO_2$ and soda will be left as fused $NA_2CO_3$. The residual soda flowing out as molten carbonate, falls into water and explodes, going into solution with the evolution of considerable heat. The preheated air admitted is under pressure in order to keep the fused carbonate moving out of the tap hole. The temperatures in the furnace should be during operation approximately as follows: In zone A between 2500° and 1700° F., zone B between 1900° and 1200° F. and gases going to boiler 2000° to 2500° F.

In the operation of this process in connection with the "sulphate" process, so called, the liquor for digestion contains approximately the following NaOH 55–60%
$Na_2S$ 25–27% together with $Na_2SO_4$, $Na_2SO_3$, $Na_2CO_3$, with traces of other salts to make up the desired strength. The sulphate process has a selective solvent action, in which not all the intercellular matter is dissolved giving what is called "kraft" pulp.

The chemical action of my process in connection with the sulphate waste liquor in the furnace is different. The products distilled off and burned are methyl and ethyl mercaptans, hydrogen sulphide, pyroligneous acids, tars, light oils and permanent gases of methane and ethane series. The residual carbon, soda sulphate, thio sulphate and sulphide, with carbonates, when heated, gives off CO, the latter then being mixed with air burns to $CO_2$. The sulphates $Na_2SO_4+4C$ produce $Na_2S+4CO$, all the others containing sulphur and oxygen being reduced to sulphide in like manner. As the reduction of $Na_2SO_4$ to $Na_2S$ is endothermic some heat is last in forming the sulphide. The temperatures will range as follows under normal conditions. Temperatures if excess air is admitted at bottom, oxidation of sulphides occur, with an exothermic reaction and higher temperatures.

The volatile products or gases pass through conduit 12 in to the boiler and stack. These products serve as heating means for producing steam under the boiler (not shown). Consequently, after the initial preheating of the chamber there is a continuous production of heat to continue the process and also serve as heat producing means in other apparatus.

In general the process contemplates the recovery of the useful constituents of the waste liquor and the utilization of the excess heat value of the combustible material originally in solution.

My invention can be used with waste liquors from other processes, for instance, the monosulphite process. The volatiles in the furnace are almost identical with those of the "sulphate" process and the furnace reactions are similar. The temperatures in the furnace will be slightly different.

It will thus be seen that I have invented a process that can be used to recover sodium and sulphur from waste pulp liquors as well as heat and I have found that sufficient heat was recovered giving fuel values sufficient for a well equipped soda mill to operate almost independently on steam, except for the mechanical power required. I have found that 12,000 pounds of steam is recovered for each 500 gallons of waste liquors so that for a plant having 50,000 gallons there will be 1,200,000 pounds of steam.

The steam requirements of such a plant are:

| | Pounds |
|---|---|
| Evaporation | 500,000 |
| Digesters | 437,000 |
| Causticizing | 50,000 |
| Bleaching | 250,000 |
| | 1,237,000 |

By means of my invention a pulp mill should be practically self supporting except in electric power.

It is obvious that various changes and modifications may be made in the details and construction herein indicated and described without departing from the general spirit of the invention as set forth in the appended claims, for instance, the air entering the nozzles has been described as being preheated but under certain conditions and with certain waste liquors it need not be.

I claim:

1. In an apparatus for treating paper pulp waste products, a vertical retort having an upper zone and a communicating lower zone, inlet devices in said upper zone for introducing waste products therein in finely distributed form, air inlet ports in said upper zone, additional air inlet ports in said lower zone, an outlet in said upper zone for heated waste gases, means for controlling the quantity of air to said ports, and an outlet in said lower zone for the non-gaseous residue.

2. In an apparatus for treating paper pulp waste products, a vertical retort comprising an outer air tight casing and an inner refractory lining spaced therefrom to provide secondary air heating chambers, having an upper zone and a communicating lower zone, inlet devices in said upper zone for introducing waste products therein in finely distributed form, air inlet ports in the lining of said upper zone, additional air inlet ports in the lining of said lower zone, said air inlet ports communicating with said air heating chambers, means for controlling the quantity of secondary air, an outlet in said upper zone for heated waste gases, and an outlet in said lower zone for the non-gaseous residue.

Signed at New York, in the county of New York, and State of New York, this 15th day of January, A. D. 1924.

CHARLES L. WAGNER.